United States Patent
Zucchelli et al.

(10) Patent No.: US 10,119,019 B2
(45) Date of Patent: Nov. 6, 2018

(54) ENVIRONMENTAL FRIENDLY FLAME RETARDANT MOULDING COMPOSITIONS BASED ON THERMOPLASTIC IMPACT MODIFIED STYRENIC POLYMERS

(71) Applicant: ITALMATCH CHEMICALS S.p.A., Genoa (IT)

(72) Inventors: Ugo Zucchelli, San Benigno (IT); Massimiliano Rosichetti, San Benigno (IT)

(73) Assignee: ITALMATCH CHEMICALS S.p.A., Genoa (IT)

( * ) Notice: Subject to any disclaimer, the term of this patent is extended or adjusted under 35 U.S.C. 154(b) by 0 days.

(21) Appl. No.: 15/308,689

(22) PCT Filed: May 6, 2014

(86) PCT No.: PCT/IB2014/000672
§ 371 (c)(1),
(2) Date: Nov. 3, 2016

(87) PCT Pub. No.: WO2015/170130
PCT Pub. Date: Nov. 12, 2015

(65) Prior Publication Data
US 2017/0190899 A1    Jul. 6, 2017

(51) Int. Cl.
*C08L 55/02* (2006.01)
*C08L 27/18* (2006.01)
*C08K 3/32* (2006.01)
*C08K 5/53* (2006.01)
*C08K 7/02* (2006.01)
*C08L 25/08* (2006.01)
*C08L 27/08* (2006.01)
*C08K 5/5333* (2006.01)

(52) U.S. Cl.
CPC ............... *C08L 55/02* (2013.01); *C08K 3/32* (2013.01); *C08K 5/5333* (2013.01); *C08K 7/02* (2013.01); *C08L 25/08* (2013.01); *C08L 27/08* (2013.01); *C08L 27/18* (2013.01); *C08L 2201/22* (2013.01)

(58) Field of Classification Search
CPC .......... C08L 55/02; C08L 27/18; C08L 25/08; C08L 27/08; C08L 2201/22; C08K 3/32; C08K 5/5333; C08K 7/02
USPC ......................................................... 524/127
See application file for complete search history.

(56) References Cited

U.S. PATENT DOCUMENTS

| 2007/0082995 A1* | 4/2007 | Costanzi ................. C08K 3/32 524/414 |
| 2008/0125526 A1* | 5/2008 | Bae ......................... C08L 25/06 524/127 |
| 2013/0065051 A1* | 3/2013 | Chen ........................ C08K 5/52 428/375 |

FOREIGN PATENT DOCUMENTS

| CN | 102746608 | 10/2012 |
| CN | 103113708 | 5/2013 |

OTHER PUBLICATIONS

International Search Report of PCT/IB2014/000672 dated Dec. 15, 2014.
IPRP issued for International Search Report of PCT/IB2014/000672 dated Nov. 8, 2016.
Office Action dated Jan. 24, 2018 for corresponding European Patent Application No. 14727046.6.

* cited by examiner

*Primary Examiner* — Angela C Scott

(57) ABSTRACT

Object of the present invention is to provide halogen-free highly flame retardant styrene impact modified polymers able to perform V0 classification on thin items, according to international standard UL-94.

13 Claims, No Drawings

ENVIRONMENTAL FRIENDLY FLAME RETARDANT MOULDING COMPOSITIONS BASED ON THERMOPLASTIC IMPACT MODIFIED STYRENIC POLYMERS

RELATED APPLICATION

This application is a U.S. national phase application of international application number PCT/IB2014/000672, filed May 6, 2014, which designates the U.S. and the contents of which are hereby incorporated by reference as if set forth in their entirety.

BACKGROUND OF THE INVENTION

Chemical composition of organic polymers make them easily combustible. A wide variety of flame retardant additives is therefore usually blend into polymers, to achieve stringent flame retardant standards, demanded by processors and even by national/international legislations.

Recently, despite the fact that halogen free flame retardant agents/additives (FR) represent, generally speaking, solutions that are more expensive compared to traditional brominated flame retardant agents, some preference has been given to halogen free flame retardant additives because of environmental as well as safety reasons. Therefore, halogen free flame retardant agents (FR) are of increasing interest in the thermoplastic polymers market. Basic requirements for these products are good processing performances in compounding and moulding conditions, good mechanical and electrical properties in the solid state, no blooming or discoloration during moulding or later on, good flame retardant properties in both reinforced and unreinforced polymers.

Pure polystyrene is fairly hard, but brittle. Higher impact performances products may be obtained by modifying them with rubbers, such as, for example, polybutadiene rubber. Accordingly, impact modified styrenic polymers are obtained.

Impact modified styrenic polymers can be described as a continuous, rigid styrenic thermoplastic continuous phase containing dispersed rubber particles as additional phase. The rubber phase may be difficult to disperse finely into the thermoplastic continuous phase by melt mixing into extruders, because of different interfacial surface tension of the two polymers. Impact properties of products containing well-dispersed rubber are generally much better than impact properties of products containing rubber not well-dispersed.

Adding rubber during styrene phase polymerization may form some graft copolymers, which being chemically bond to polystyrene phase, may act as homogenizing for the rubber itself. Polymerization may be done in the monomer mass, emulsion or suspension.

Impact modified styrenic polymers are also known as rubber modified styrenic polymers and some well known examples include high impact polystyrene (HIPS) and acrylonitryle butadiene styrene copolymer (ABS).

Impact modified styrenic polymers are widely used in electronics and consumer goods such as computer consoles, televisions, cellular phone, computers, stereos, toys and many other.

HIPS and ABS are commercially avaliable and are produced by well known methods.

Flame retardant HIPS and ABS are achieved using brominated compounds as flame retardant agents, because of their ability to keep good mechanical properties of the polymers, such as impact resistance. Among the most commonly used flame-retardant agents for ABS and HIPS, are etylene bis(tetrabromophtalimide), decabromo di phenylethane, brominated epoxy oligomers and tetrabromo bis phenol A. Antimony oxide may be used as synergist. Brominated compounds however need to be replaced, owing to progressive restrictions in the use of halogenated flame retardants.

Some commercial non-halogen flame retardant alternatives used in HIPS are, for example, organic aryl phosphorous compounds such as:
Resorcinol bis (biphenyl phosphate)
Bis phenol A bis (biphenyl phosphate)
Polymeric biphenyl phosphate
Diphenyl cresyl phosphate
Triphenyl phosphate.

These organic aryl phosphorus flame retardant agents, however, are not able to meet the most stringent criteria in term of flame retardant performances, i.e. UL-94 V0, indeed resulting successful only as UL-94 V2.

Polymer producers have been, till now, unsuccessful in trying to obtain halogen-free HIPS and ABS flame retardant agents which would meet the highest standards of flame retardancy, i.e. UL-94 V0.

HIPS flame retardant halogen free agents, meeting the highest flame retardancy standards, are made by blends of high impact styrene polymers with Phenyl ether polymers, and are commercially available. Phenyl ether polymers are characterized by high level of inherent flame retardancy. These polymer compositions are simply called "HIPS" or more correctly "HIPS/PPO". Commercial phenyl ether polymers belong to two different chemical classes: polyphenyl ethers (PPE) and polyphenylene oxides (PPO). PPE and PPO are similar in chemical composition, they are generally treated as equivalent materials, and generally, both referred to as PPO. They are polymers difficult to process, and despite blending with Polystirene or HIPS make the polymer composition easier to process, many difficulties are still faced in molding operations, compared to pure HIPS resins. Moreover, PPO is generally more expensive than HIPS resins themselves. HIPS/PPO blends are not objective of the present invention.

ABS flame retardant halogen free products meeting the highest flame retardancy standards are made by blending ABS polymers with Polycarbonate, and are available from major producers. Polycarbonate is characterized by high level of inherent flame retardancy. These compositions are called "PC/ABS". Polycarbonate is a polymer difficult to process, and despite the fact that its blending with ABS makes the composition easier to process, some difficulties are still faced during molding operations, in comparison to pure ABS resins. Moreover, polycarbonate is generally more expensive than ABS resins themselves. PC/ABS blends are not according to the present invention.

CN 102746608A discloses an environment-friendly flame retardant ABS resin composed by an aluminum hypophosphite and an at least an auxiliary flame retardant chosen from polyehtylene wax, calcium stearate, pentaerythritol, melamine cyanurate and ammonium polyphosphate. However, these compositions lack of sufficient flame retardant properties, particularly they do not reach V0 classification according to UL-94 standard on 1.6 mm thickness.

CN 103113708A describes an ABS flame retardant resin where the flame retardant agent is an organic phosphinate salt or hypophosphite salt and a synergic ammonium salt. However, also in this case, these compositions lack of sufficient processability, giving rise to flames and smoke during the compounding step.

There is indeed a need for highly flame retardant compositions based on polystyrene polymers, characterized by high flame retardant properties and satisfactory process stability.

OBJECT OF THE INVENTION

Object of the present invention is to provide halogen-free highly flame retardant styrene impact modified polymers, unreinforced or reinforced.

Another object of the present invention is to provide halogen-free highly flame retardant styrene impact modified polymers able to perform V0 classification on thin items, according to international standard UL-94.

Again another object of the present invention is to provide halogen-free highly flame retardant styrene impact modified polymers able to perform V0 classification on sample specimens preferably lower than 3.2 mm, and more preferably equal to 1.6 mm Still another object of the present invention is to provide halogen free flame retardant moulding composition and articles, based on halogen-free highly flame retardant styrene impact modified polymers, with good aesthetical and mechanical properties.

DESCRIPTION OF THE INVENTION

These and other objects according to the present invention, are achieved by a polymer composition consisting of:
a) at least an impact modified thermoplastic styrenic polymer
b) at least an Hypophosphorus acid metal salt, otherwise called inorganic Phosphinate or Hypophosphite with the same meaning, where phosphorus valence state is equal to +1, being a first flame retardant (FR) component
c) at least an aromatic phosphorus ester, being a second flame retardant (FR) component
d) at least an antidripping agent
e) fillers and /or reinforcing fibers
f) other conventional additives.

According to the present invention, said thermoplastic styrenic impact modified polymer is preferably selected as ABS and/or HIPS.

Object of the present invention are therefore flame retardant compositions based on impact modified styrene polymers like ABS and HIPS, an hypophosphorus acid metal salt, an aromatic phosphorus ester, an antidripping additive and other conventional additives.

Hypophosphorus acid metal salts, also called inorganic Phosphinates or Hypophosphites, are characterized by phosphorus valence state equal to +1. Hypophosphorus acid metal salts or Hypophosphites have the following chemical formula:

where:
"n" is an integer number ranging from 1 to 4 in dependence of the valence of the metal Me. The metal Me is any atom belonging to groups I, II, III and IV of the periodic table of the elements.

Sodium and calcium Hypophosphites are widely commercially available and are normally produced by reacting the corresponding metal hydroxide on yellow phosphorus, for instance according to the following reaction scheme, where Me could be selected as Ca:

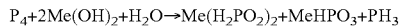

Hypophosphites of metals other than Calcium and Sodium, are normally produced through the hypophosphorus acid reaction on the corresponding metal hydroxide or by exchange reaction with the corresponding soluble metal salts (see for instance "Hypophosphorus Acid and its salts, *Russian Chemical Review*, 44 (12), 1975"). Thus, the present invention relates to halogen-free flame retardant compositions, essentially comprising impact modified styrene polymers, at least an Hypophosporous acid metallic salt, at least an aromatic phosphorus ester as flame retardant agent, at least an antidripping additive and other conventional additives. Such compositions are highly flame retarded and easy mouldable.

Particularly preferred are those compositions where said impact modified styrene polymers is selected as acrylonitrile butadiene styrene (ABS) or high impact polystyrene (HIPS), said Hypophosporous acid metallic salt is selected as Aluminium hypophosphite, said aromatic phosphorus ester is selected as Resorcinol bis (2.6-dixylenyl phosphate, said antidripping additive and other conventional additives such as fillers, pigments, thermal and process stabilizers.

Always according to the present invention, said other conventional additives are selected as processing aids, heat and process stabilizers, UV stabilizers, pigments, dispersing agents, mold release additives, nucleating agents and their mixtures.

Always according to the present invention, said Hypophosphoric acid metal salt, also called inorganic Phosphinate or Hypophosphite where phosphorus valence state is equal to +1, is preferably Aluminium Hypophosphite.

Again, according to the present invention, said aromatic phosphorus ester based flame retardant agent, is preferably Resorcinol bis (2.6-dixylenyl phosphate). Further aspects of the present invention, are described here below in more details.

a) Thermoplastic Styrenic Impact Modified Resin such as ABS or HIPS

HIPS is prepared by dispersing a polymeric rubber phase into styrene monomer, styrene is polymerized into a thermoplastic phase in the presence of the rubber and a grafting agent. Rubber may be partially crosslinked, and does separate from the mixture as the molecolar weight of styrene does increase. In some embodiments, rubber may contain a styrenic monomer grafted, like SBR (styrene butadiene rubber). The amount of grafting between the rubber and the thermoplastic phase may vary and depend upon application.

ABS is prepared by dispersing a polymeric rubber phase into styrene and acrylonitrile monomer, then styrene and acrylonitrile are copolymerized in the presence of the rubber and a grafting agent. Rubber may be partially crosslinked, and does separate as the styrene/acrylonitrile copolymer increase molecolar weight. Rubber is typically butadiene type rubber, but can be selected from copolymers of styrene and acrylonitrile, alkylacrylate, copolymer of butadiene and styrene, isoprene-type rubber. In some embodiments, rubber may contain a styrenic monomer and an acrylonitrile grafted monomer, like SAN (styrene acrylonitrile rubber). The amount of grafting between the rubber and the thermoplastic phase may vary and depend upon application.

b) Hypophosphites also called Hypophosphorus Acid Metal Salts also called Inorganic Phosphinates The selection of the most appropriate Hypophosphite is subjected to a number of critical factors. Particularly, suitable hypophosphites must have sufficient thermal stability to overcome melt processing at temperature higher than about 200° C. If they do form hydrates, they must be used in the corresponding anhydrous form and they must not be hygroscopic when they are subsequently exposed to ambient humidity. Examples of such Hypophosphites are Aluminum hypophosphite (CAS 7784-22-7), Calcium hypophosphite (CAS 7789-79-9), Manganese hypophosphite (10043-84-2), Magnesium hypophosphite (CAS 10377-57-8), Zinc hypophosphite (CAS 15060-64-7), Barium hypophosphite (CAS 171258-64-3). Most preferred according to the present invention are Aluminum and Calcium hypophosphites.

Aluminum hypophosphite, corresponding to chemical formula $Al(H_2PO_2)_3$, is currently produced, for example, by Italmatch Chemicals Spa (under commercial name "Phoslite IP-A") in a white powder form with a low humidity level, high purity and different particle size distribution (PSD) suitable for thermoplastic processing.

Calcium hypophosphite, corresponding to chemical formula $Ca(H_2PO_2)_2$, is also currently produced for example by Italmatch Chemicals Spa (under commercial name "Phoslite IP-C"). This compound shows lower flame retardant performances in polyester when compared to Aluminum hypophosphite. However, it can be advantageously used in those applications where thermal resistance of Aluminum hypophosphite would be critical.

Aluminum and Calcium hypophosphites, being flammable powders as most of anhydrous hypophosphites, are often commercialized as a dry blend powder with other solid flame retardants or even in masterbatch form, for easier transport and manipulation.

c) Aromatic phosphorus ester

The aromatic phosphorous ester can be represented in the following general chemical structure:

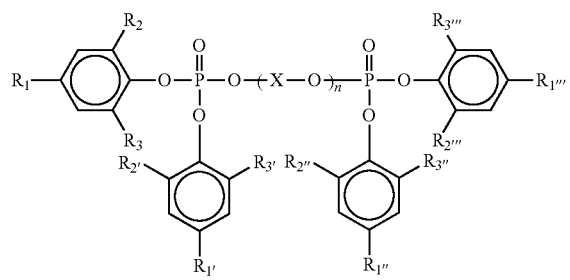

Wherein each R1, R2, R3, R1', R2', R3', R1", R2", R3", R1''', R2''', R3''' is independently chosen as H or C1 to C4 alkyl, and X is selected as C6 aryl or diphenylmethane derivatives, and "n" is an integer ranging from 0 to 7.

For example, when n=0, examples may include tryphenyl phosphate, tri(2,6-dimethyl) phosphate and combinations.

For example, when n=1 to 7 and X=aryl, examples may include resorcinol bis (diphenyl phosphate) or resorcinol bis (2.6-dixylenyl phosphate).

For example, when n=1-2 and $X=(CH_3)_2C(C_6H_6)_2$, examples may include bis-phenol A bis (diphenyl phosphate).

Preferred aromatic phosphorus esters, acting as flame retardant agents according to the present invention, are solid at ambient temperature, i.e. with melting point higher than about 40° C. and more preferably melting point higher than about 80° C.

One example of aromatic phosphorus ester according to the present invention is Resorcinol bis (2.6-dixylenyl phosphate) (RDX) having the following chemical structure:

Resorcinol bis (2,6-dixylenyl phosphate) (RDX)

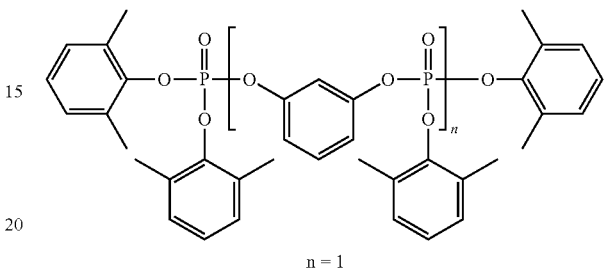

n = 1

Solid phosphates compared to liquids, shows advantages for the purpose of present invention because they can be mixed in the powder form with the Hypophosphite, that is a flammable solid, suppressing the flammability of the powder mix itself. Handling of not flammable powder has indeed advantages in term of safety, equipment and complexity of operations. Thus, the combined use of aromatic phosphorus esters and Hypophosphites also called Hypophosphorus acid metal salts, makes easier handling of said compounds, their processability, and the industrial process for the preparation of the flame retardant halogen-free styrene impact modified polymer composition of the invention.

d) Antidripping Agents

PTFE is widely used as an anti dripping in flame retardant polymer formulations for his contribution to achieve UL-94 V0 or similar standards required. The high molecular weight PTFE components form micro fibrils under shear conditions during plastic molding. The stressed fibrils create a physical frozen network into the plastic matrix. Relaxation of the fibrils during plastic burning cause contraction and suppress dripping in a wide range of plastics.

Although efficient in drip suppression, sometimes high molecular weight PTFE is difficult to handle due to his tendency to agglomerate that makes it difficult to dose on industrial scale.

Special modified grades can guarantee high dispersion efficiency with excellent powder flow, like acrylic modified polytetrafluoroethylene (PTFE) or styrene acrylo nitrile (SAN) coated PTFE, sometimes called "TSAN". Such products are individually described for instance in EP0758010A1 or in WO03062291A1. Usually, antidripping additives are used in the range of 0.1-0.6% in weight on final polymer composition.

e) Fillers and /or Reinforcing Fibers

Examples of preferred reinforcing fibers according to the present invention are carbon fibers, aramid fibers and preferably glass fibers to be used in the commercially available form of chopped glass. In order to improve compatibility with thermoplastic resins, the reinforcing fibers may have been surface treated with a silane compound. Reinforcing fibers are used in the range from 10% to 50%, preferably from 20% to 35% by weight on the weight of the final polymer composition: if the amount is lower, no advantage is observed in the mechanical properties and if the amount is higher than 50% by weight, viscosity of the melt is too high.

Example of fillers according to the invention are glass beads, hollow glass spheres, amorphous silica, chalk, mica, calcinated kaolin, wollastonite, talc, magnesium carbonate, barium sulphate or similar products and they may have been surface treated with fatty acids or the like or may have been milled in presence of fatty acids or the like. Any particulate substance currently available in the market as a filler for thermoplastic resins may be used in the compositions according to the present invention, provided that the average particle size of the powder, measured by laser instrument, is in the range of about 2 microns to 20 microns.

f) Other Conventional Additives

Novel flame retardant compositions based on impact modified styrene polymers according to the invention, may also contain one or more of the following compounds: processing aids, heat and process stabilizers, UV stabilizers, pigments, dispersing agents, mould release additives, nucleating agents, partially crosslinked elastic polymers used as impact modifiers, and their mixtures.

The following experimental examples are given in a non-limitative way.

EXPERIMENTAL PART

In the following examples, the below listed components were used:
Polymers:
  ABS (Magnum ABS 3904, by STYRON), hereafter also indicated as "ABS"
  HIPS (Edistir SR 550, by Enichem Versalis), hereafter also indicated as "HIPS"
Reinforcing Agents:
  Glass fiber (PPG3786, by PPG), hereafter also indicated as "GF"
Stabilizers:
  Hindered phenol heat stabilizer (Irganox 1010, by BASF), hereafter also indicated as "Irg. 1010"
  Phosphite process stabiliser (Irgaphos 168, by BASF), hereafter also indicated as "Irg. 168"
Hypophosphite:
  Aluminium hypophosphite (Phoslite IP-A, by Italmatch Chemicals), hereafter also indicated as "IP-A"
Aromatic Phosphorus Ester:
  Resorcinol bis (2.6-dixylenyl phosphate) (Daihachi PX200, by Daihachi Chemicals), hereafter also indicated as "RDX"
Antidripping:
  Fluorinated copolymer (Dyneon MM 3595, by 3M), hereafter also indicated as "PTFE"
Flame Retardant Agents Not According to the Present Invention but Taken Into Consideration for Comparative Examples:
  Melamine cyanurate (Melagard MC25, by Italmatch Chemicals), hereafter also indicated as "MC"
  Ammonium polyphosphate (Exolit AP 422, by Clariant), hereafter also indicated as "APP"
Lubricants Considered for Comparative Examples:
  Polyethylene wax (Kemfluid 201, by Undesa), hereafter also indicated as "PE wax"
  Calcium stearate (Kemistab EC, by Undesa), hereafter also indicated as "CaStear"
Others Additives for Comparative Examples:
  Pentaerythritol (Charmor PM40, by Perstorp), hereafter also indicated as "PERT"
  Ammonium sulphate (Reagent Grade), hereafter also indicated as "$(NH_4)_2SO_4$"
  Ammonium chloride (Reagent Grade), hereafter also indicated as "$NH_4Cl$"

Examples According to the Present Invention (EX.6 TO EX.9) and Comparative Examples (C.1 TO C.5, C.9 TO C.16)

All components indicated according to table 1 were mixed in a 20 mm twin screw extruded with a temperature profile in the range 220-230° C. Pellets were moulded injected at different thickness, and 5 specimens were conditioned for 24 hours at 23° C. and 50% humidity. Flammability have been reported according to UL-94 procedure. When tests do not meet V0, V1, V2, an NC classification has been given. When it was not possible to extrude or inject samples, an NP classification was attributed.

TABLE 1

(Examples and Comparative examples)

| | C.1 | C.2 | C.3 | C.4 | C.5 | Ex. 6 | Ex. 7 | Ex. 8 | Ex. 9 | C.10 | C.11 | C.12 | C.13 | C.14 | C.15 | C.16 |
|---|---|---|---|---|---|---|---|---|---|---|---|---|---|---|---|---|
| ABS | 64.6% | 74.6% | 79.6% | 64.6% | 64.3% | 64.3% | 49.3% | 74.3% | — | — | — | — | — | — | — | — |
| HIPS | — | — | — | — | — | — | — | — | 64.3% | — | — | — | — | — | — | — |
| IP-A | 35% | — | — | 24.5% | 35% | 24.5% | 17.5% | 17.5% | 24.5% | 15% | 17% | 17% | 15% | 20% | 15% | 15% |
| RDX | — | 25% | 20% | 10.5% | — | 10.5% | 7.5% | 7.5% | 10.5% | — | — | — | — | — | — | — |
| PTFE | — | — | — | — | 0.3% | 0.3% | 0.3% | 0.3% | 0.3% | — | — | — | — | — | — | — |
| MC | — | — | — | — | — | — | — | — | — | 5% | 5% | — | 7% | — | — | — |
| APP | — | — | — | — | — | — | — | — | — | — | — | 5% | — | — | — | — |
| PE wax | — | — | — | — | — | — | — | — | — | 2% | — | — | — | 5% | — | — |
| CaStear | — | — | — | — | — | — | — | — | — | — | — | — | 3% | — | — | — |
| PERT | — | — | — | — | — | — | — | — | — | 3% | 3% | 3% | — | — | — | — |
| UL-94 (3.2 mm) | V0 | — | NC | V2 | V0 | V0 | V0 | V0 | V0 | V2 | V2 | — | V2 | V2 | — | — |
| UL-94 (1.6 mm) | NC | — | — | V2 | NC | V0 | V0 | NC | V0 | NC | NC | — | NC | NC | — | — |

*OK = good processability; NP = not processable

Comments to Table 1, Examples According to the Invention (Ex.6 to Ex.9) and Comparative Examples (C.1 to C.5)

In comparative example C.1 it is shown how IP-A alone at 35% loading is not able to reach UL-94 V0 at 1.6 mm In comparative example C.2 it is shown that the composition where RDX is included alone at 25% is not processable. In comparative example C.3 it is shown that the composition including RDX alone at 20% is not effective in UL-94. In comparative example C.4 it is shown that the combination of IP-A and RDX results in a composition that does not reach UL-94 V0 on 1.6 mm but only V2 grade. In comparative example C.5 it is shown that the polymer composition comprising IP-A, even in presence of PTFE, is not able to reach UL-94 V0 on 1.6 mm.

In Example 6 and 9, according to present invention, it is shown that the combination of IP-A, RDX and PTFE in the same composition, is able to allow the resulting polymer, based on both ABS and HIPS, to reach UL-94 V0 at 1.6 mm In Example 7 according to present invention it is shown that even in presence of glass fiber, the combination of IP-A, RDX and PTFE is able to give a polymer composition able to reach UL-94 V0.

In example 8, always according to present invention, it is shown that even at 25.3% loading, the combination of IP-A, RDX and PTFE is effective and give a polymer composition that does reach UL-94 V0 at 3.2 mm.

Comments to Table 1, Comparative Examples C. 10 to C. 14 (According to CN 102746608A)

Comparative examples C.10 to C.14 show how combinations of Aluminum hypophosphite (IP-A) with the different elements described as synergic in CN 102746608A, are not able to reach UL-94 V0 or they are not processable.

Comments to Table 1, Comparative Examples C. 15 and C. 16 (According to CN 103113708A)

Comparative examples C.15 and C.16 show how combinations of Aluminum hypophosphite (IP-A) with ammonium salts as described in CN 102746608A, are not processable.

In view of the above, as already said, the polymer compositions as described in CN 102746608A and CN 103113708A do not work satisfactory according to the goals of the present invention, because never reach V0 classification on specimens of 3.2 mm, nor on specimens of 1.6 mm On the contrary, the differences in the composition according to the prior art with respect to the compositions according to the present invention, are such that V0 classification is always met by the flame retardant polymer composition according to the present invention, at least on a 3.2 mm thickness of the specimens, according to UL-94 test.

Examples C.17-E.20

The component as indicated in table 2 were intimately mixed in an high speed lab mixer and formed into an unbroken strip or powder train about 250 mm long by 20 mm wide by 10 mm high on a non-combustible, non-porous and low heat-conducting base plate. Powdery or granular substances are loosely filled into a mould 250 mm long with a triangular crosssection of inner height 10 mm and width 20 mm The mould is then dropped three times from a height of 2 cm onto a solid surface. If necessary, the mould is then filled up again. The lateral limitations are then removed and the excess substance scraped off. A non-combustible, non-porous and low heat-conducting base plate is placed on top of the mould, the apparatus inverted and the mould removed. A hot flame from a gas burner (diameter 5 mm) is applied to one end of the powder train until the powder ignites or for a maximum of 2 minutes. If the powder does not ignite and does not propagate combustion either by burning with flame or smoldering along 200 mm of the powder train within the 4 minutes (or 40 minutes) test period, then the substance should not be considered as flammable. If the powder does burn the burning time of the strip is reported.

TABLE 2

|  | C.17 | C.18 | E.19 | E.20 |
|---|---|---|---|---|
| IP-A (%) | 100 | 95% | 85% | 70% |
| RDX (%) | — | 5% | 15% | 30% |
| Flammable/not Flammable | Flammable | Flammable | Not Flammable | Not Flammable |
| Burning time | 2' | 1'20" | — | — |

The invention claimed is:

1. Halogen free flame retardant impact modified styrenic thermoplastic composition consisting entirely of:
    a) one or more thermoplastic impact modified styrenic polymers;
    b) a first flame retardant (FR) component comprising one or more hypophosphorous acid metal salts having a phosphorus valence state being equal to +1;
    c) a second flame retardant (FR) component comprising one or more aromatic phosphorus esters;
    d) one or more antidripping agents;
    e) at least one of fillers and reinforcing fibers; and
    f) conventional additives.

2. The halogen free flame retardant impact modified styrenic thermoplastic composition according to claim 1, wherein said conventional additives are selected from the group consisting of processing aids, heat and process stabilizers, UV stabilizers, pigments, dispersing agents, mold release additives, nucleating agents and their mixtures.

3. The halogen free flame retardant impact modified styrenic thermoplastic composition according to claim 1, wherein said hypophosphorus acid metal salt is aluminium hypophosphite.

4. The halogen free flame retardant impact modified styrenic thermoplastic composition according to claim 1, wherein said aromatic phosphorus ester is resorcinol bis (2,6-dixylenyl phosphate).

5. The halogen free flame retardant impact modified styrenic thermoplastic composition according to claim 1, wherein said antidripping agent is based on polytetrafluoroethylene (PTFE).

6. The halogen free flame retardant impact modified styrenic thermoplastic composition according to claim 1, wherein said styrene impact modified thermoplastic polymer is acrylonitryle butadiene styrene copolymer (ABS).

7. The halogen free flame retardant impact modified styrenic thermoplastic composition according to claim 1, wherein said styrene impact modified thermoplastic polymer is high impact polystyrene (HIPS).

8. The halogen free flame retardant impact modified styrenic thermoplastic composition according to claim 1, wherein said first and said second flame retardant components are intimately mixed, obtaining a not flammable powder mixture.

9. A method for forming a flame retardant moulding product comprising:
    providing a composition consisting entirely of one or more thermoplastic impact modified styrenic polymers, a first flame retardant (FR) component comprising one or more hypophosphorus acid metal salts having a phosphorus valence state being equal to +1, one or more aromatic phosphorus esters as a second FR component, one or more antidripping agents, at least one of fillers and reinforcing fibers, and conventional additives; and manufacturing a moulding composition or a moulding article using said composition.

10. The method as in claim 9, wherein said hypophosphorus acid metal salt is aluminium hypophosphite and said aromatic phosphorus ester is resorcinol bis (2,6-dixylenyl phosphate).

11. The method as in claim 9, wherein said styrene impact modified thermoplastic polymer is acrylonitryle butadiene styrene copolymer ABS.

12. The method as in claim 9, wherein said styrene impact modified thermoplastic polymer is high impact polystyrene HIPS.

13. The method as in claim 9, wherein providing includes mixing said first and said second FR components to produce a non flammable powder mixture.

* * * * *